No. 824,761. PATENTED JULY 3, 1906.
M. W. TOWNSEND.
LAWN MOWER.
APPLICATION FILED JAN. 12, 1906.
2 SHEETS—SHEET 1.
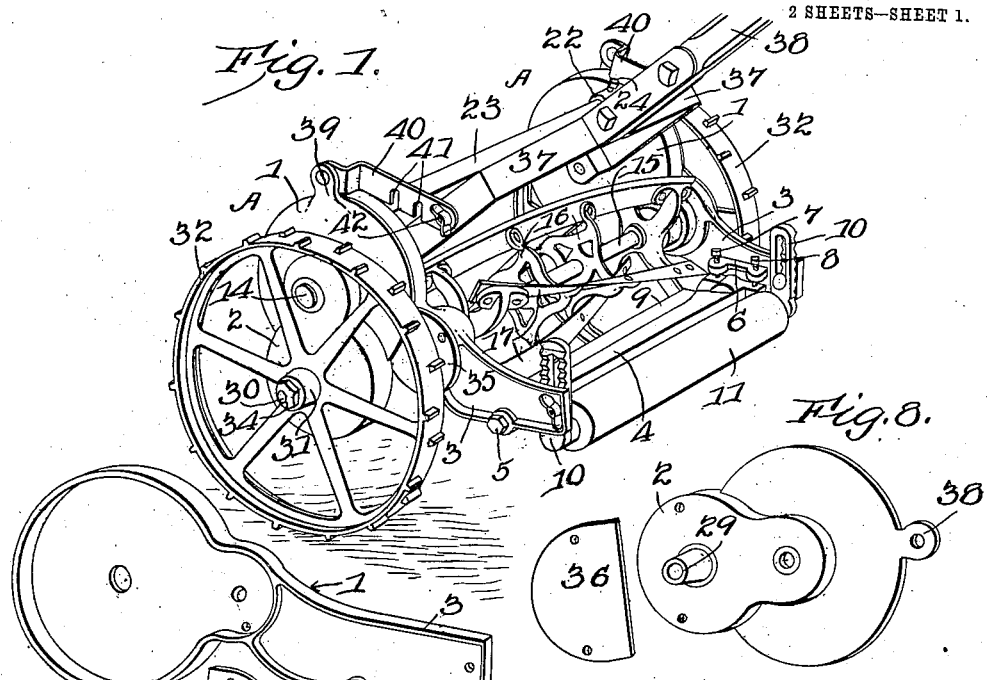
Fig. 1.
Fig. 8.
Fig. 7.
Fig. 5.
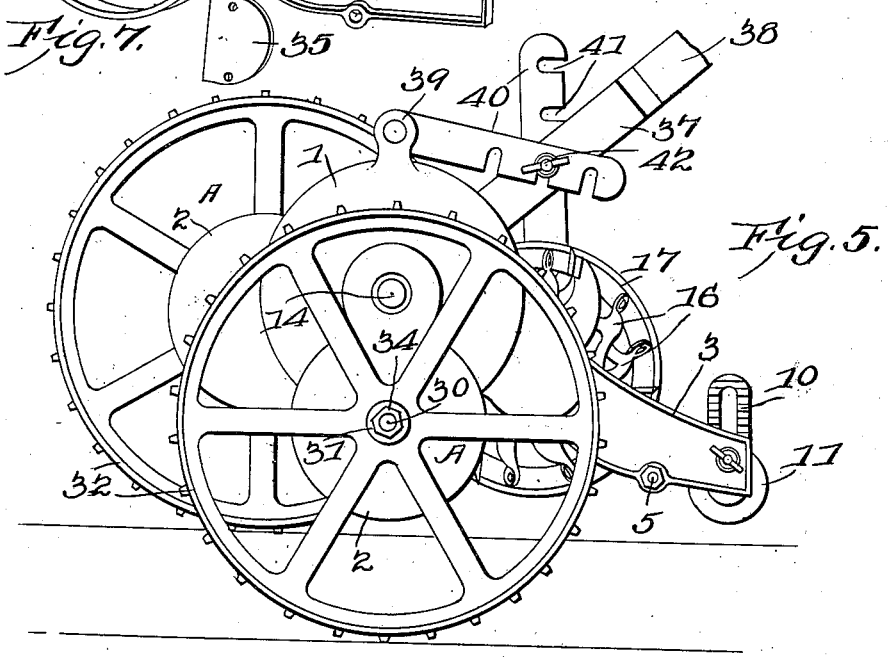
WITNESSES:
Melville W. Townsend, INVENTOR
By
ATTORNEYS No. 824,761. PATENTED JULY 3, 1906.
M. W. TOWNSEND.
LAWN MOWER.
APPLICATION FILED JAN. 12, 1906.
2 SHEETS—SHEET 2.
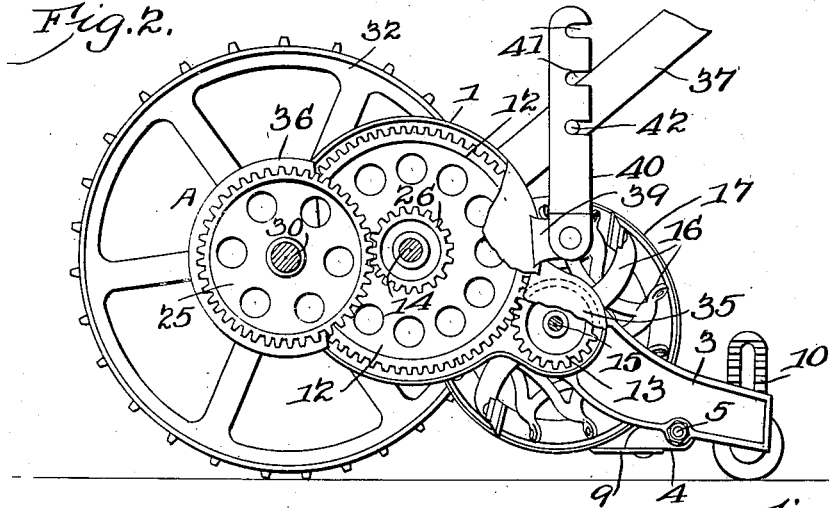
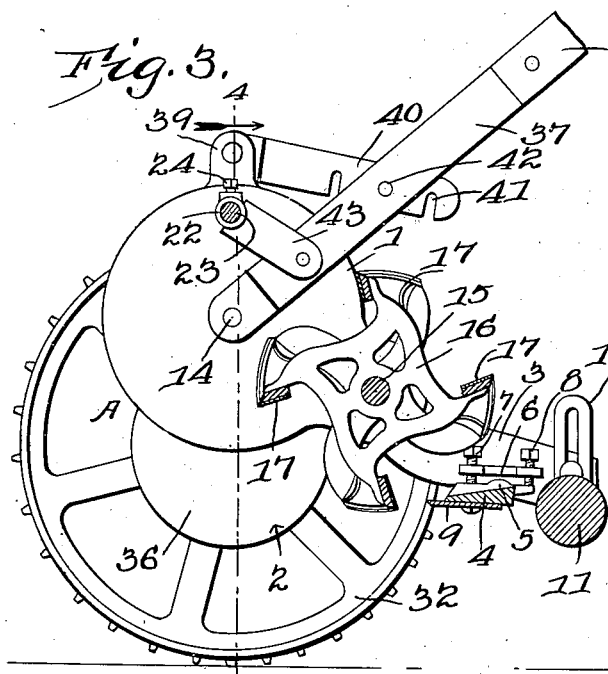
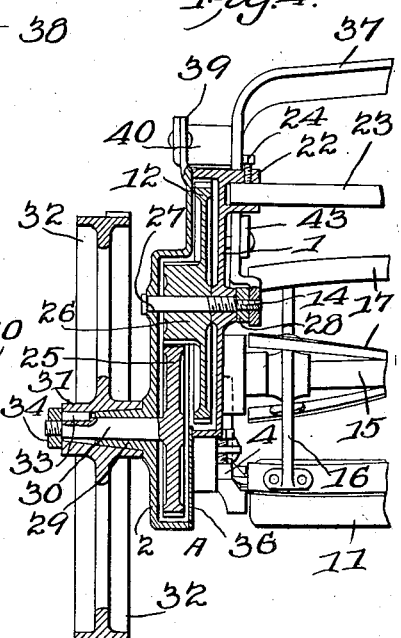
WITNESSES:
Melville W. Townsend,
INVENTOR.
By C. A. Snow & Co.
ATTORNEYS

UNITED STATES PATENT OFFICE.

MELVILLE W. TOWNSEND, OF MARTINSVILLE, OHIO.

LAWN-MOWER.

No. 824,761.  Specification of Letters Patent.  Patented July 3, 1906.

Application filed January 12, 1906. Serial No. 295,799.

*To all whom it may concern:*

Be it known that I, MELVILLE W. TOWNSEND, a citizen of the United States, residing at Martinsville, in the county of Clinton and State of Ohio, have invented a new and useful Lawn-Mower, of which the following is a specification.

This invention relates to lawn-mowers; and it has for its object to provide an improved construction whereby the cutting apparatus may be raised and lowered and supported at various elevations for the purpose of trimming grass at various distances above the ground, thus enabling tall grass or weeds to be first trimmed by removing the tops and afterward recut at the proper closeness to the ground.

Further objects of the invention are to simplify and improve the construction and operation of this class of machines.

With these and other ends in view, which will readily appear as the nature of the invention is better understood, the same consists in the improved construction and novel arrangement and combination of parts, which will be hereinafter fully described, and particularly pointed out in the claims.

In the accompanying drawings, Figure 1 is a perspective view of a lawn-mower constructed in accordance with the principles of the invention. Fig. 2 is a side elevation of the machine, showing the cutting apparatus in a lowered position, parts of the gear-casings having been broken away for the purpose of exhibiting the gearing. Fig. 3 is a longitudinal vertical sectional view of the machine, showing the cutting apparatus in a raised position. Fig. 4 is a vertical transverse sectional detail view taken through one side of the machine and on the plane indicated by the line 4 4 in Fig. 3. Fig. 5 is a side elevation showing the two wheels of the machine adjusted at different elevations in position for operating, for instance, upon the edge of a lawn elevated above a driveway. Fig. 6 is a detail view illustrating the means for transmitting motion to the knife-carrying reel. Figs. 7 and 8 are detail views of the gear-casings which coöperate to constitute the frame of the machine.

Corresponding parts in the several figures are indicated throughout by similar characters of reference.

The frame of the improved lawn-mower has two side members A A, each of which is made up principally of two gear-casings, which will be described as the inner gear-casing 1 and the outer gear-casing 2. The inner gear-casings 1 have rearwardly-extending arms 3, which are connected by and serve to support the cutter-bar 4, the latter being pivotally connected with the arms 3, as by means of machine-screws 5, having non-circular heads. Upon the inner sides of the arms 3 are formed brackets 6, having set-screws 7 and 8, that bear upon the upper side of the cutter-bar, respectively in front and in rear of the axial line of the pivots, thus enabling the cutter-bar, which is equipped with a blade 9, to be adjusted in the usual manner in order that the blade may be properly engaged by the spiral knives or cutters carried by the reel, to be presently described. The arms 3 also carry the vertically-adjustable slotted plates 10, which are provided at their lower ends with bearings for the roller 11.

Each of the gear-casings 1 contains a large spur-wheel 12 and a smaller spur wheel or pinion 13, meshing together, the large spur-wheel 12 being supported for rotation upon a pintle 14, while the pinions 13 in the two gear-casings 1 1 are mounted upon the shaft 15, carrying the reel 16, which is equipped in the usual manner with spirally-disposed blades or cutters 17, the edges of which are adapted to engage the edge of the blade 9, supported by the cutter-bar, to make a shearing cut. The pinions 13 are provided with cavities 18, in which are pivoted gravity-pawls 19, engaging ratchet-wheels 20, which latter are fixed upon the shaft 15, by means of keys, as 21, while the pinions are loose upon the shaft. It follows that rotary motion will be transmitted to the reel-carrying shaft only when the machine is propelled in a forward direction, a reverse movement of the pinions resulting in the pawls 19 slipping idly over the ratchets 20. The gear-casings 1 1 at the sides of the machine are provided with sockets 22 for the reception of the ends of a spacing-rod 23, which is retained in said sockets, as by means of set-screws 24. The said gear-casings 1 1, together with the cutter-bar 4 and the spacing-rod 23, thus constitute a frame which is sufficiently stiff and rigid for the purposes of the device.

The outer gear-casings 2 2 constitute housings for spur-wheels 25 and for pinions 26, meshing together, the pinions 26 being rigidly connected with or formed integral with the spur-wheels 12, the gear-casings 2 being provided with apertures 27 for the passage of the pintles 14, which latter have been illustrated as being in the nature of bolts that extend through the gear-casings 1 and 2, which are thereby pivotally connected, said bolts being preferably threaded into the gear-casings 1 and provided with lock-nuts 28, whereby the parts may be retained securely in proper relation without danger of becoming too tight or too loose. The gear-casings 2 are provided with tubular spindles 29, that afford bearings for the shafts 30, carrying the spur-wheels 25, said shafts being extended through and beyond said tubular spindles, as will be clearly seen by reference to Fig. 4 of the drawings. The hubs 31 of the carrying-wheels 32 are journaled upon the tubular spindle 29, and said hubs are connected with the shafts 30, as by means of keys 33 and nuts 34. Thus when the carrying-wheels are rotated by contact with the ground the shafts 30 and the spur-wheels 25 will be rotated, transmitting motion through the pinions 26 and the spur-wheels 12 to the pinions 13 upon the reel-carrying shaft 15, which latter will thus be rotated when the machine moves in a forward direction, while the pinions 13 rotate idly upon the reel-carrying shaft when the machine is moved in a rearward direction.

When the gear-casings 1 and 2 are connected by means of the pintles 14, upon which the gear-casings 2 are free to swing, the outer sides of the pinions 13 and the inner sides of the spur-wheels 25 will be partly exposed, inasmuch as the said gear-casings do not completely lap over each other. To remedy this deficiency, separate covers, as 35 and 36, of sheet metal or other suitable material, are provided, said covers being connected, respectively, with the gear-casings 1 and 2, as by means of ordinary machine-screws. This is essential in order to permit he tgear-casings 2, with which the carrying-wheels are connected, to swing pivotally upon the pintles 14, the spur-wheels 25 moving orbitally around the pinions 26.

The handle bars or irons 37, which are connected in the usual manner at their upper ends with the handle 38, are pivoted at their lower ends upon the inner extremities of the bolts or pintles 14. The gear-casings 2 are provided with lugs 39, upon which are pivoted latch members 40, having each a plurality of notches 41, adapted to engage studs 42 upon the handle-irons. The latter are provided with pivoted auxiliary latch members, as 43, adapted, when the cutting apparatus is to be supported in a raised position, as in Fig. 3 of the drawings, to engage the brace-rod 23, thus supporting the weight of the apparatus and preventing any liability of the latter to drop, owing to the gear-casings 2 turning upon the pivots 14.

The operation and advantages of the improved construction herein described will readily appear from the foregoing description, when taken in connection with the drawings. When the machine is in operation, the gear-casings are stationary, and much of the rattle and noise usually accompanying the manipulation of this class of machines will therefore be avoided. The carrying-wheels are large and therefore capable of developing considerable power, and a train of three gears being used at each side of the machine the reel-carrying bar will develop considerable speed. The main frame of the machine, including the gear-casings 1 1, the parts connecting said gear-casings, and the parts supported thereby may be bodily lifted or elevated with relation to the carrying-wheels, the latch members 40 having been previously disconnected from the studs 42 and the gear-casings 2 2 turning pivotally upon the pintles 14 while the adjustment is taking place. After the adjustment has been effected the parts may be again connected and sustained in the desired relative positions by restoring the latch members 40 to engagement with the studs 42. When it is desired to operate, for instance, upon the edge of a lawn which is elevated above a driveway, one of the carrying-wheels may be lowered, as will be clearly seen in Fig. 5 of the drawings.

This improved lawn-mower may be conveniently used in connection with a receptacle for the cut grass, which is especially desirable when the grass is topped, in order to prevent the cut grass from interfering with the second operation of the lawn-mower.

Having thus described the invention, what is claimed is—

1. In a lawn-mower, a frame, members pivoted upon the frame and constituting housings, said members having tubular spindles spaced from their pivotal points, carrying-wheels journaled upon the tubular spindles, shafts connected with the carrying-wheels and extending through the tubular spindles, and gear-wheels upon the shafts within the housings.

2. In a lawn-mower, a frame, a reel-carrying shaft journaled in said frame, members pivoted upon said frame and having tubular spindles spaced from their pivotal points, carrying-wheels journaled upon said tubular spindles, shafts extending through the latter and connected with the carrying-wheels, and means for transmitting motion from said shafts to the reel-carrying shaft.

3. In a lawn-mower, a frame, a reel-carrying shaft journaled in said frame, members pivoted upon said frame and having tubular spindles spaced from their pivotal points, carrying-wheels journaled upon said tubular spindles, shafts extending through the latter and connected with the carrying-wheels, spur-wheels upon said shafts, pinions journaled upon the pintles in the pivoted members and meshing with said spur-wheels, and means for transmitting motion from said pinions to the reel-carrying shaft.

4. In a lawn-mower, a frame, a reel-carrying shaft journaled in said frame, pintles connected with the latter, spur-wheels journaled upon said pintles, pinions adjacent to and connected with said spur-wheels, members pivoted upon the pintles and having tubular spindles, carrying-wheels upon said spindles, shafts extending through the latter and connected with the carrying-wheels, spur-wheels upon said shafts meshing with the pinions upon the pintles, and pinions mounted upon and having clutch connection with the reel-carrying shaft and meshing with the spur-wheels upon the pintles.

5. In a lawn-mower, a frame including gear-casings having rearwardly-extending arms, a rod spacing and connecting the gear-casings, and a cutter-bar spacing and connecting the arms; pintles extending through the gear-casings, auxiliary gear-casings pivoted upon the pintles and having tubular spindles, carrying-wheels journaled upon the spindles, a reel supported for rotation by the frame, and trains of gears within the gear-casings for transmitting motion from the carrying-wheels to the reel-carrying shaft.

6. In a lawn-mower, a frame including a pair of gear-casings and a spacing-rod, pintles extending through the gear-casings, handle-irons connected with the inner ends of the pintles, auxiliary gear-casings pivotally connected with the outer ends of the pintles, carrying-wheels supported by the auxiliary gear-casings, and latch members connecting the auxiliary gear-casings adjustably with the handle-irons.

7. A frame including a pair of gear-casings and a spacing-rod, pintles extending through said gear-casings, handle-irons connected with the inner ends of the pintles, auxiliary gear-casings pivoted upon the outer ends of the pintles, carrying-wheels journaled upon the auxiliary gear-casings, latch members connecting the latter adjustably with the handle-irons, and latch members pivoted upon the latter and adapted to engage the spacing-rod of the frame.

In testimony that I claim the foregoing as my own I have hereto affixed my signature in the presence of two witnesses.

MELVILLE W. TOWNSEND.

Witnesses:
 OLIVER J. TOWNSEND,
 GEORGE E. CARROLL.